United States Patent [19]

Sopcisak

[11] Patent Number: 5,614,669

[45] Date of Patent: Mar. 25, 1997

[54] AIR PRESSURE GAUGE WITH DUST-CAP REMOVER

[76] Inventor: Michael I. Sopcisak, 112 Colby Ct., Vacaville, Calif. 95687

[21] Appl. No.: 409,495

[22] Filed: Mar. 23, 1995

[51] Int. Cl.$^6$ .................................................. B60C 23/02
[52] U.S. Cl. ............................................................ 73/146.8
[58] Field of Search ........................ 73/146.2, 146.8; 33/169 B

[56] References Cited

U.S. PATENT DOCUMENTS

| | | | |
|---|---|---|---|
| 1,129,450 | 2/1915 | Campbell | 73/146.8 |
| 2,679,654 | 7/1954 | Hosking . | |
| 3,140,603 | 7/1964 | Williams | 73/146.3 |
| 3,145,689 | 8/1964 | O'Neal | 73/146.8 |
| 3,696,668 | 10/1972 | Patrick | 73/146.8 |
| 3,852,839 | 12/1974 | Blessing | 73/146.8 |
| 4,526,030 | 7/1985 | Vecera, Jr. | 73/146.8 |

*Primary Examiner*—Richard Chilcot
*Assistant Examiner*—William L. Oen

[57] ABSTRACT

The air pressure gauge tool of the present invention provides an air gauge capable of accessing, loosening, removing, retaining, and reinstalling tire valve dust-caps as well as measuring tire pressure. A tire valve dust-cap engaging receptacle is attached to a conventional tire pressure gauge of the type having a cylindrical body. The dust-cap engaging receptacle is comprised of a socket-type cylindrical receptacle, with an open top end and parallel splines lining its internal circumference, for receiving and engaging a tire valve dust-cap.

7 Claims, 2 Drawing Sheets

U.S. Patent       Mar. 25, 1997      Sheet 1 of 2      5,614,669
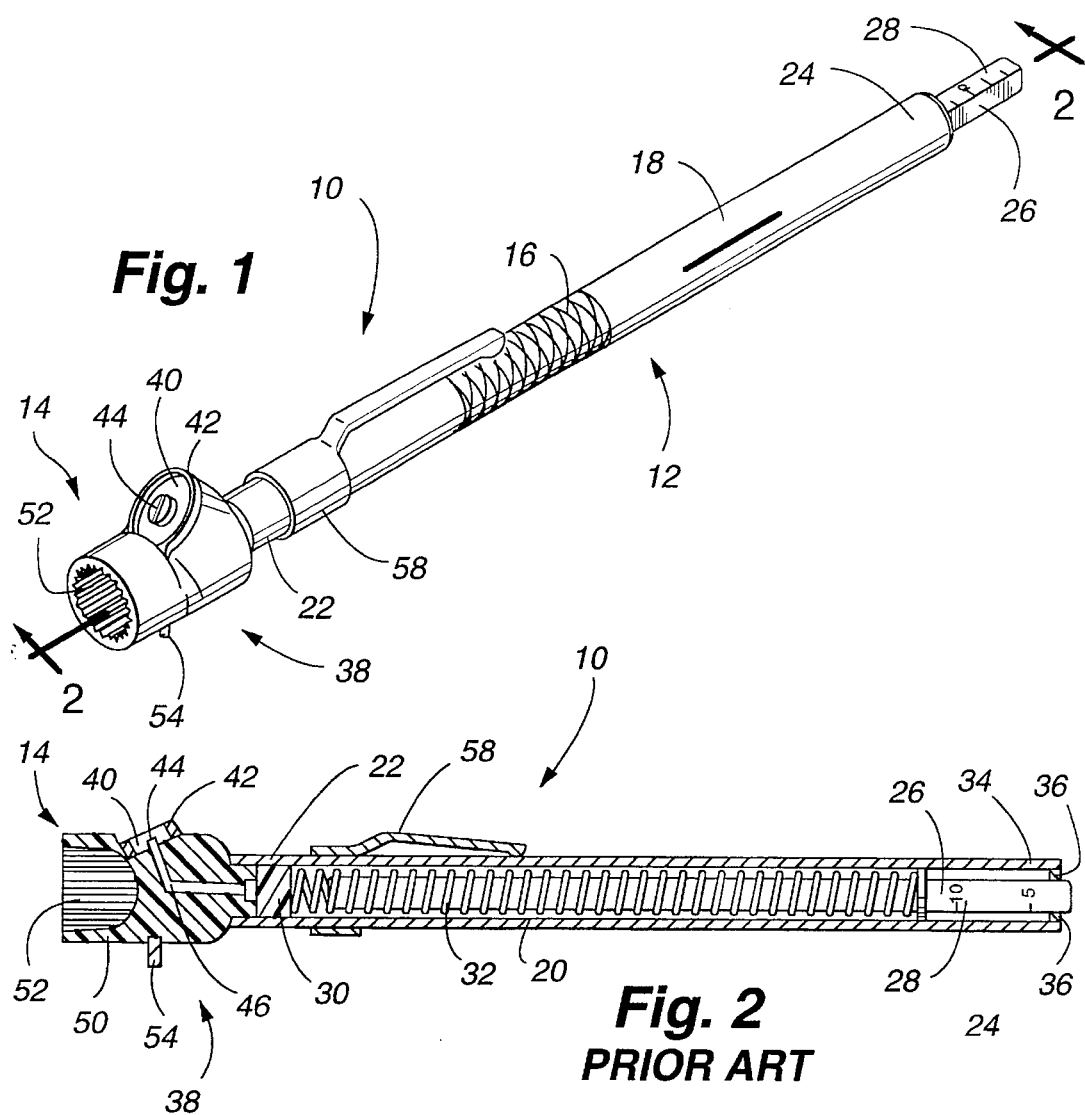
Fig. 1
Fig. 2
PRIOR ART
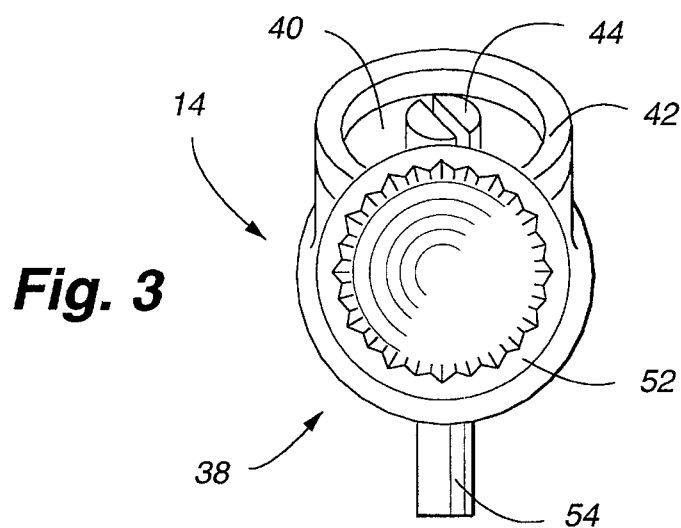
Fig. 3

AIR PRESSURE GAUGE WITH DUST-CAP REMOVER

FIELD OF INVENTION

This invention relates to pneumatic-tire pressure gauges, specifically to gauges capable of measuring tire pressure as well as removing, retaining, and reinstalling tire valve dust-caps.

DESCRIPTION OF PRIOR ART

Maintaining correct tire pressure can provide safer, smoother vehicle handling and can reduce unnecessary tire-tread wear. In order to maintain a recommended pressure level, tire pressure must be measured and adjusted on a periodic basis. Typically, tire pressure is measured by removing the tire valve dust-cap and measuring tire pressure with an air gauge. Tire pressure can then be increased by applying compressed air to the tire valve or decreased by depressing the release pin on the tire-valve core. After measuring and adjusting tire pressure, the dust cap is reinstalled in order to protect the valve core from corrosion and damage.

In performing these operations, dust caps are generally removed by hand. Subsequently, the removed dust-caps are either set aside or are held in the tester's hand, mouth, or pocket while tire pressure is measured and adjusted. Once tire pressure is set to the desired level, the dust caps are then retrieved and reinstalled by hand.

Unfortunately, there are a number of disadvantages inherent in the aforementioned process:

a) The present process of removing dust caps by hand can be difficult if dust caps are inaccessible due to the configuration of the vehicle's tire, wheel, or wheel cover. Access and removal of such dust caps often requires the use of additional tools, which are not always readily available. Access and removal of dust caps can also require removal of wheel cover, if the vehicle is so equipped. In such cases, accessing and removing dust caps in order to measure and adjust tire pressure can become both frustrating and time consuming. Prior art provides no means to access and remove dust caps.

(b) The present process of removing dust caps by hand can be difficult if dust caps are corroded or over-tightened. Ability to loosen and remove such caps often requires the use of additional tools, which are not always readily available. In such cases, loosening and removing dust caps in order to measure and adjust tire pressure can become both frustrating and time consuming. Prior art provides no means to loosen and remove dust caps.

(c) The present process requires that the removed dust-caps either be set aside or held in the tester's hand, mouth, or pocket while tire pressure is measured and adjusted. The handling of the removed dust-caps inherent in the present process is not only time consuming, but can also result in misplaced or lost dust-caps. Efforts to locate or replace lost dust-caps can waste additional time and failure to install a dust cap on the tire valve can lead to valve core corrosion or damage. Additionally, the direct handling of dust caps required by the present process may involve contact with tire valves and caps that are wet, corroded, or dirty. This can result in the undesired soiling of tester's hands, clothes, etc. Prior art provides no means to retain and secure dust caps while tire pressure is measured and adjusted.

(d) The present process of reinstalling removed dust-caps by hand can be difficult if tire valves are inaccessible due to the configuration of the vehicle's tire, wheel, or wheel cover. Reinstallation of such caps often requires the use of additional tools, which are not always readily available. This can be both frustrating and time consuming. Prior art provides no means to reinstall dust caps.

OBJECTS AND ADVANTAGES

To eliminate the disadvantages inherent in the present process, the present invention provides a specially designed tire air-gauge capable of measuring tire pressure as well as removing, retaining, and reinstalling tire valve dust-caps.

In the preferred embodiment, the present invention provides a conventional tire-pressure gauge of the type having an elongated cylindrical body with a hollow interior. A pressure indicator slide bar is telescopically located within the hollow interior and is extendable and retractable from the bottom end of the cylindrical body. A tire valve and valve dust-cap operating head is attached to the top of the cylindrical body. A cup and spring mechanism is positioned within the hollow interior of the cylindrical body for communication between the tire valve operating head and the pressure indicator slide bar. A bottom guide having an opening therein fits into the open bottom end of the cylindrical body to guide the pressure indicator bar in and out of the hollow interior. A dust-cap engaging receptacle is attached to the top of the tire valve and valve dust-cap operating head. The dust-cap engaging receptacle is comprised of a coaxially mounted, internally splined, cylindrical receptacle and is provided for receiving, removing, retaining, and reinstalling a valve dust-cap. A pocket clip is positioned on the exterior of the cylindrical body near the top end thereof. A stem or knob is fixedly mounted to the exterior of the tire valve and valve dust-cap operating head for depressing of a central displacement needle seat, as utilized in tire valves. A cross-hatch textured surface is embodied circumferentially on a portion of the exterior of the cylindrical body to facilitate grasping and rotation of the air gauge with dust cap remover.

The foregoing summary of the preferred embodiment is intended to broadly outline the details and features of the present invention. The summary is neither intended to define the invention, which is measured by the claims, nor is it intended to be limiting as to the scope of the invention in any way. Further details and features of the present invention will become apparent from a consideration of the following specifications, descriptions, drawings, and claims.

It is therefore the aim of the present invention to provide a specially designed tire air-pressure gauge capable of measuring tire pressure as well as removing, retaining, and reinstalling tire valve dust-caps. Accordingly, several of the objects and advantages of the present invention are:

(a) To provide an air gauge with means to measure tire pressure.

(b) To provide an air gauge with means to access and remove tire valve dust-caps.

(c) To provide an air gauge with means to loosen and remove tire valve dust-caps.

(d) To provide an air gauge with means to retain tire valve dust-caps while tire pressure is measured and adjusted.

(e) To provide an air gauge with means to reinstall removed tire valve dust-caps.

A further object and advantage of the present invention is to provide an air gauge which can be used to easily and conveniently access, loosen, remove, retain, and reinstall dust caps without the need to handle dust caps directly.

Still another object and advantage of the present invention is to provide an air gauge which can easily be grasped and rotated in the user's hand. Still further objects and advantages of the present invention will become apparent from a consideration of the following specifications, descriptions, drawings, and claims.

DESCRIPTION OF DRAWINGS

FIG. 1 is a perspective view of the air pressure gauge with dust-cap remover of the present invention.

FIG. 2 is a cross-sectional view of the present invention.

FIG. 3 is a top view of the present invention.

DETAILED DESCRIPTION OF THE PREFERRED EMBODIMENT

Figure 4:
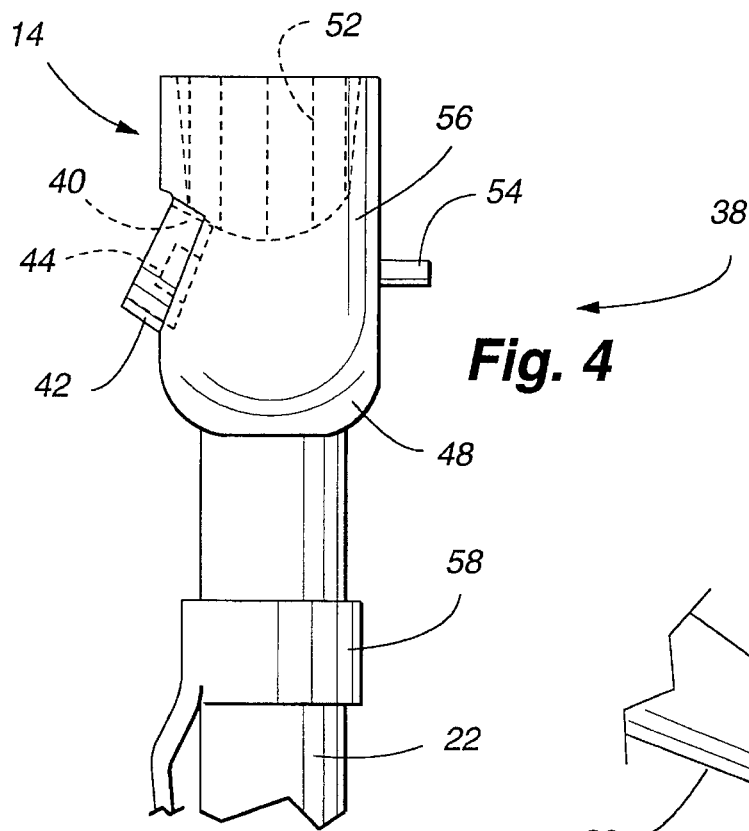
FIG. 4 is a perspective view of the top portion of the present invention.

Referring to FIGS. 1 through 6, the air gauge with cap remover 10 of the present invention is shown. The air gauge 10 includes a pressure gauge assembly 12 for measuring the pressure of a pneumatic tire, a dust-cap engaging receptacle 14 for removing, retaining, and reinstalling tire valve dust-caps, and a cross-hatch textured grip 16 for grasping and rotating the air gauge 10 during removal and reinstallation of tire valve dust-caps.

The pressure gauge assembly 12 is similar to a conventional tire gauge assembly commonly used in the art to measure the pressure of a pneumatic tire. The pressure gauge assembly 12 has an elongated cylindrical body 18. The cylindrical body 18 has a hollow interior 20, a top end 22, and a bottom end 24. Typically, the cylindrical body is approximately 4½ to 5½ inches in length with a diameter of approximately ¼ to ½ inch. Preferably, the cylindrical body 18 is manufactured from brass, but other metals and plastics may be used.

A pressure indicator slide bar 26 telescopically fits within the hollow interior 20 of the cylindrical body 18 through the bottom end 24 of the cylindrical body 18. The slide bar 26 has a linear scale 28 printed thereon from which the pressure of the tested tire can be read. Also located within the hollow interior 20 of the cylindrical body 18 is a rubber cup 30 and a spring 32. The spring 32 extends the length of the cylindrical body 18 and surrounds the slide bar 26. The rubber cup 30 rests within the top end 22 of the cylindrical body 18 against the adjacent end of the spring 32. A bottom guide 34 with an opening 36 frictionally engages the slide bar 26 and fits into the bottom end 24 of the cylindrical body 18. Preferably, the slide bar 26 and the bottom guide 34 are made from a plastic.

A tire valve and valve dust-cap operating head 38 is attached to the top of the cylindrical body 18. Preferably, the operating head 38 is manufactured from brass and is pressed onto the cylindrical body 18. However, the operating head 38 can be made of others metals or plastics and can be attached to the cylindrical body 18 by other methods including incorporating the operating head 38 and the cylindrical body 18 as a single component.

Referring to FIGS. 1 through 4, the tire valve and valve dust-cap operating head 38 has a cylindrical cavity 40 with a circular lip 42 and a pressure pin 44, centrally located within the cavity 40, which engages the tire valve stem and shifts it into open position to determine tire pressure. A passage 46 within the operating head 38 directs air, under pressure, from the tire to the rubber cup 30 within the top end 22 of the cylindrical body 18. The rubber cup 30 is shifted, by the pressurized air from the tire, acting against the action of the spring 32, moving it towards the bottom end 24 of the cylindrical body 18. The movement of the rubber cup 30 forces the slide bar 26 partway out of the bottom end 24 of the cylindrical body 18 in accordance to the amount of air pressure acting on the rubber cup 30 to reflect on the linear scale 28 the air pressure of the tire.

A dust-cap engaging receptacle 14 is attached to the top portion 48 of the operating head 38. The dust-cap receptacle 14 is comprised of a socket-type cylindrical receptacle 50 extending vertically from the top portion 48 of the operating head 38. The dust-cap receptacle 14 has an external diameter of approximately ½ inch and extends vertically to a height of approximately ⅜ to ½ inch above the top portion 48 of the operating head 38. The dust-cap receptacle 14 has a plurality of parallel splines 52, positioned along its internal circumference, designed to engage the external splines common on conventional rubber or plastic tire valve dust-caps. Preferably, there are between 20 and 30 splines approximately 1/16 to 1/32 inch in depth lining the internal circumference of the dust-cap receptacle 14. The internal diameter of the splines 52 tapers inwardly from approximately 7/16 inch at the top of the engaging receptacle 14 to approximately 5/16 inch at the bottom and provides a predetermined cross-sectional shape and size (see FIG. 2) thereby allowing the dust-cap engaging receptacle 14 to effectively receive and engage tire valve dust-caps of various sizes.

Figure 6:
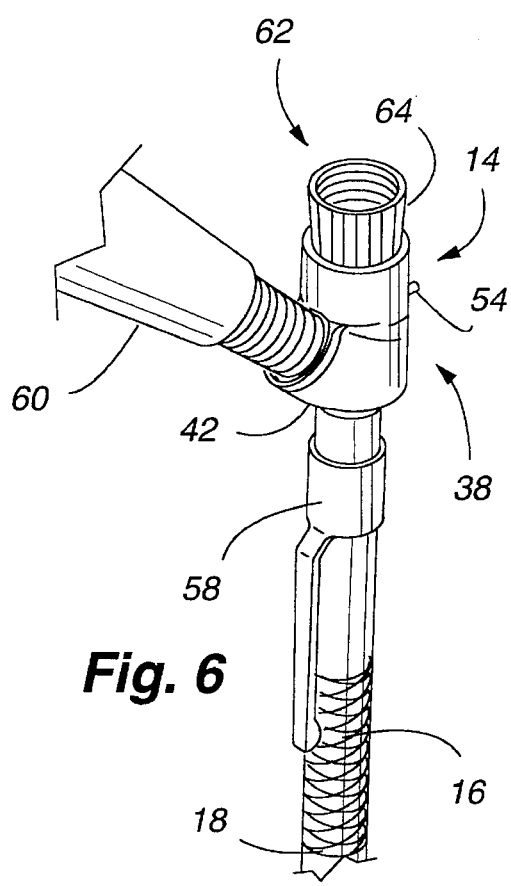
FIG. 6 is a perspective view of the present invention in an operational position retaining a tire valve dust-cap while tire pressure is measured.
Figure 5:
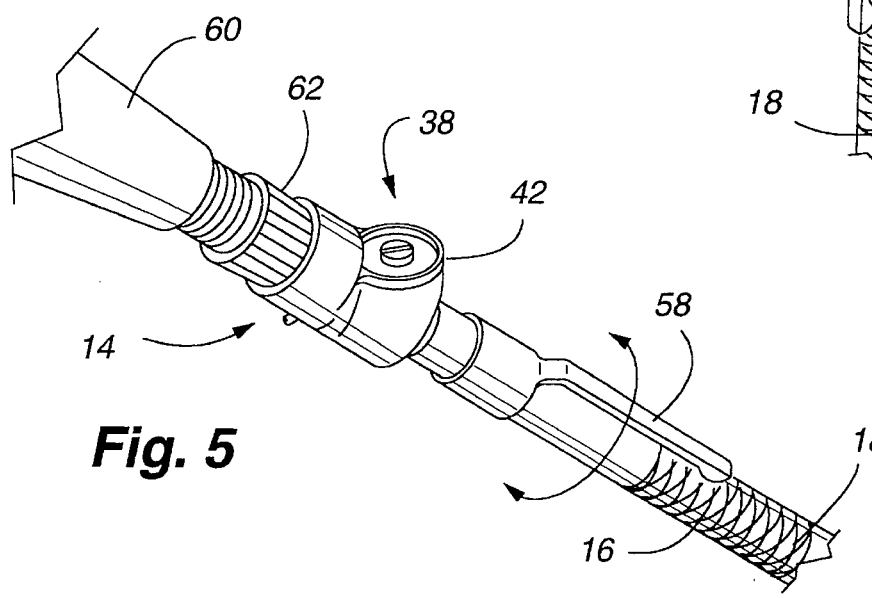
FIG. 5 is a perspective view of the present invention in an operational position removing and reinstalling a tire valve dust-cap.

In use, (see FIG. 5) the dust-cap receptacle 14 receives a tire valve dust-cap 62 and the internal splines 52 of the dust-cap receptacle 14 engage the external splines 64 of the dust cap 62. The dust cap 62 can then be removed by grasping and twisting the cylindrical body 18 in a counter-clockwise motion. Once the dust cap has been removed from the tire valve stem 60, the dust-cap engaging receptacle 14 retains the dust cap 62 while tire pressure is measured and adjusted, as shown in FIG. 6. Once desired tire pressure is obtained, the dust cap 62, which is still being retained in the dust-cap receptacle 14, can be reinstalled by aligning it with the tire valve-stem 60, and twisting the cylindrical body in a clockwise motion, as shown in FIG. 5.

To facilitate the twisting motion needed to remove and reinstall tire valve dust-caps, a cross-hatch textured grip 16 is embodied circumferentially on a portion of the external surface of the cylindrical body 18.

Additionally, a short knob or stem is positioned on the rear portion 56 of the operating head 38 to facilitate releasing excess air from the tire valve. A pocket clip 58 can also be provided to allow storage of air gauge with cap remover 10 in shirt pocket during nonuse.

Accordingly, the reader will see that the air pressure gauge of the present invention can be used to access, loosen, remove, retain, and reinstall tire valve dust-caps that may be difficult without the advantages of the present invention. In addition, the air pressure gauge with cap remover of the present invention can be used to easily and conveniently access, loosen, remove, retain, and reinstall tire valve dust-caps without the need to handle the dust caps directly. The air pressure gauge with cap remover of the present invention reduces the amount of direct handling of dust caps and the need for additional tools required by the present process, thereby saving time and unnecessary frustration.

Although the static description above contains many specificities, it is not intended to be limiting as to the scope of the invention but as merely providing illustrations of some of the presently preferred embodiments of this invention. It will be apparent to anyone skilled in the art that the same results could be achieved by using various shapes, designs, or materials, and that the improvements provided by the present invention could be adapted to any conventional air gauge.

Thus the scope of the inventions should be determined by the appended claims and their legal equivalents, rather than by the descriptions and examples given.

NUMERICAL LISTING OF COMPONENTS

| | |
|---|---|
| 10 Air gauge with cap remover | 12 Pressure gauge assembly |
| 14 Dust-cap engaging receptacle | 16 Cross-hatch texture grip |
| 18 Elongated cylindrical body | 20 Hollow interior |
| 22 Top end | 24 Bottom end |
| 26 Slide bar | 28 Linear scale |
| 30 Rubber cup | 32 Spring |
| 34 Bottom guide | 36 Opening |
| 38 Tire valve and valve dust-cap operating head | 40 Cylindrical cavity |
| 42 Circular lip | 44 Pressure pin |
| 46 Pressure passage | 48 Top portion/Op. head |
| 50 Cylindrical receptacle | 52 Internal splines |
| 54 Short stem or knob | 56 Rear portion/Op. head |
| 58 Pocket clip | 60 Tire valve-stem |
| 62 Tire valve dust-cap | 64 External splines |

What is claimed is:

1. An Air Pressure Gauge Tool for measuring tire pressure and for accessing, removing, retaining, and replacing tire valve dust-caps comprising;

(a) an air pressure gauge assembly of the type having an elongated cylindrical body and a hollow interior, the cylindrical body having a top and a bottom end, a pressure indicator slide bar with a linear scale extendable outward from said bottom end, a tire valve operating head attached to said top end, a cup and spring mechanism located within said hollow interior whereby upon said tire valve operating head being connected to a source of pressurized air, the air pressure is directed through said tire valve operating head, upon said cup and spring mechanism, forcibly extending said indicator slide bar outwardly from said bottom end thereby displaying a numerical value corresponding to the amount of air pressure;

(b) engaging means, including a tire valve dust-cap receiving and engaging receptacle, for substantially receiving and engaging a tire valve dust-cap thereby facilitating access, removal, retention, and reinstallation of said tire valve dust-cap.

2. The air pressure gauge tool as described in claim 1 wherein the tire valve dust-cap receiving and engaging receptacle is comprised of a socket-type cylindrical receptacle with an open top end wherethrough a tire valve dust-cap is substantially received.

3. The air pressure gauge tool as described in claim 1 wherein the tire valve operating head has a top portion, said tire valve dust-cap receiving and engaging receptacle being attached substantially vertically to said top portion.

4. The air pressure gauge tool as described in claim 1 wherein said tire valve dust-cap receptacle is attached substantially coaxially to said cylindrical body.

5. The air pressure gauge tool as described in claim 2 wherein said tire valve dust-cap receptacle has a plurality of vertical, parallel splines lining its internal circumference whereby a tire valve dust-cap is substantially engaged.

6. The air pressure gauge tool as described in claim 2 wherein said receptacle has a predetermined cross-sectional shape whereby tire valve dust-caps of various sizes are effectively received and engaged.

7. The air pressure gauge tool as described in claim 1 further including a textured grip whereby said air pressure gauge tool of the present invention can be grasped and twisted thereby facilitating removal and reinstallation of a tire valve dust-cap.

* * * * *